United States Patent Office 3,026,178
Patented Mar. 20, 1962

3,026,178
PREPARATION OF BORIC OXIDE AND BORIC ACID
John L. Margrave, Madison, and Sterling P. Randall, Green Bay, Wis., assignors to Callery Chemical Company, Pittsburgh, Pa., a corporation of Pennsylvania
No Drawing. Filed Oct. 16, 1958, Ser. No. 767,499
6 Claims. (Cl. 23—149)

This invention relates to the preparation of anhydrous and hydrated boric oxide from metal borates.

Boric acid and its dehydration product, boric oxide, are several of the more important industrial chemicals and at present are probably the most important boron compounds. They are generally prepared from certain minerals in which the boron is found as borate ions associated with the more active and common metals. The preferred process for preparing boric acid from metal borates is at present a digestion with a mineral acid with subsequent partial evaporation of the solution and crystallization of the boric acid. Although this method has been successfully used, it has inherent disadvantages in that it requires careful control because of the complicated solution system present and the necessity for handling large volumes of water.

It is therefore one object of this invention to provide a method for the preparation of anhydrous and hydrated oxides of boron in which the recovery step is simple and easily practiced.

Another object is to provide a new method for preparing boron oxide and boric acid from metal borates which avoids the necessity for digestion and subsequent evaporation of large quantities of water and the crystallization of the boric acid.

Still another object is to provide a method which can be used to prepare boric acid and boron oxide from metal borates which are naturally-occurring as ores as well as metal borates which are obtained synthetically, i.e., as by-products of chemical processes apart from nature.

Other objects will become apparent from the following specification and claims.

This invention is based upon the discovery that treatment of a metal borate at high temperatures with a flow gas comprising hydrogen chloride, HCl, will produce anhydrous and hydrated oxides of boron in high purity and at a high rate.

Any metal salt of boric acid may be used as the metal borate, including naturally-occurring borate ores such as colemanite, $Ca_2B_6O_{11} \cdot 5H_2O$, kernite (or rasorite), $Na_2B_4O_7 \cdot 4H_2O$, borax, $Na_2B_4O_7 \cdot 10H_2O$, and ulexite, $NaCaB_5O_9 \cdot 8H_2O$, as well as synthetic metal borates such as sodium metaborate, $NaBO_2$, calcium metaborate, $CaBO_2$ and sodium tetraborate, $Na_2B_4O_7$.

The reaction takes place upon contacting the metal borate in a heated reaction zone with a flow gas containing HCl. The flow gas may be substantially pure HCl or the HCl may be carried into contact by an inert carrier gas. Nitrogen, argon and other inert gases are suitable for this purpose. The boron is extracted from the borate and is transferred as a complex gaseous molecule, the exact nature of which is uncertain. This molecule apparently undergoes further reaction or decomposition since upon cooling and condensing the effluent gases from the reaction zone boron oxide and boric acid are obtained.

It is necessary that a high temperature be maintained during the time the flow gas contacts the borate. The temperature should be at least about 500° C., but it does not appear desirable to use temperatures above about 1400° C.

The process is carried out using simple equipment, comprising a reactor or furnace which may be heated to high temperatures and a condensing system. The condensing system may be conveniently a simple water-cooled pipe upon which the boron oxide and boric acid produced are deposited. The metal borate is placed in the furnace and heated to the desired temperature. A flow gas consisting of HCl either in a relatively pure state or in admixture with a carrier gas is then introduced into the furnace and over or through the heated metal borate. The hot effluent gases are passed through the condensing system and are cooled by contact with the pipe, whereupon the oxide and acid are deposited and recovered by scraping or other conventional means. Efficiency of the method is increased if means are provided to agitate or grind the metal borate during the reaction, such as by tumbling or fluidization.

In such a manner, boric oxide and boric acid have been obtained in high purity and at a high rate from sodium metaborate, sodium tetraborate, borax, colemanite, kernite, and ulexite. The corresponding metal chloride was formed as the by-product; for example, treatment of anhydrous sodium tetraborate with HCl yielded boron oxide, boric acid and sodium chloride.

It may be noted that it is not necessary to use completely anhydrous HCl in the process, since water does not deleteriously affect the reaction.

According to the provisions of the patent statutes, we have explained the principle and mode of practicing our invention, have described what we now consider to be its best embodiments. However, we desire to have it understood that within the scope of the appended claims, the invention may be practiced otherwise than as specifically described.

We claim:
1. A method of producing boron oxide and boric acid which comprises contacting a metal borate with anhydrous hydrogen chloride in an amount sufficient to produce anhydrous and hydrated boron oxides, at a temperature between about 500° C. and 1400° C., cooling and condensing the effluent gases from said reaction zone, and recovering the anhydrous and hydrated oxides of boron thus produced.

2. A method according to claim 1 in which the metal borate is sodium tetraborate.

3. A method according to claim 1 in which the metal borate is borax.

4. A method according to claim 1 in which the metal borate is colemanite.

5. A method according to claim 1 in which the metal borate is kernite.

6. A method according to claim 1 in which the metal borate is ulexite.

References Cited in the file of this patent

UNITED STATES PATENTS

| 137,072 | Gutzkow | Mar. 25, 1873 |
| 650,187 | Moore | May 22, 1900 |
| 1,108,129 | Burger | Aug. 25, 1914 |
| 1,308,576 | Calvert et al. | July 1, 1919 |
| 1,888,391 | Newman | Nov. 22, 1932 |
| 2,898,192 | Harmon | Aug. 4, 1959 |

OTHER REFERENCES

Mellor: "Comprehensive Treatise on Inorganic and Theoretical Chemistry," Longmans, Green and Co., New York, N.Y., vol. 5, pp. 48–53 (1924).

Thorpe's Dictionary of Applied Chemistry, Longmans, Green and Co., New York, N.Y., third ed., vol. II, pp. 49, 50.